US012327020B2

(12) United States Patent
Seshadri et al.

(10) Patent No.: US 12,327,020 B2
(45) Date of Patent: Jun. 10, 2025

(54) VOLUME REPLICATION OF STATEFUL-SETS

(71) Applicant: INTERNATIONAL BUSINESS MACHINES CORPORATION, Armonk, NY (US)

(72) Inventors: Padmanabha Venkatagiri Seshadri, Mysore (IN); Krishnasuri Narayanam, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 48 days.

(21) Appl. No.: 18/147,692

(22) Filed: Dec. 28, 2022

(65) Prior Publication Data

US 2024/0220114 A1 Jul. 4, 2024

(51) Int. Cl.
 *G06F 3/06* (2006.01)
(52) U.S. Cl.
 CPC .......... *G06F 3/0611* (2013.01); *G06F 3/0635* (2013.01); *G06F 3/065* (2013.01); *G06F 3/067* (2013.01)
(58) Field of Classification Search
 CPC ................................. G06F 3/0611; G06F 8/60
 See application file for complete search history.

(56) References Cited

U.S. PATENT DOCUMENTS

| 10,244,034 B2 | 3/2019 | Joshi et al. |
| 10,467,039 B2 | 11/2019 | Bailey et al. |
| 10,983,719 B1 | 4/2021 | Williams et al. |
| 11,140,455 B1 * | 10/2021 | Woodruff ............ H04N 21/2187 |
| 11,960,773 B2 * | 4/2024 | Cain ...................... G06F 3/0611 |
| 2019/0243836 A1 | 8/2019 | Nanda et al. |
| 2020/0125533 A1 * | 4/2020 | Gladkikh ............. G06F 9/45558 |
| 2021/0303523 A1 | 9/2021 | Periyagaram et al. |
| 2021/0357315 A1 * | 11/2021 | Padubidri ................. G06F 8/60 |

(Continued)

FOREIGN PATENT DOCUMENTS

WO    2019113216 A1    6/2019

OTHER PUBLICATIONS

Ball, T. et al., "Efficient Path Profiling", Proceedings of MICRO-2, Paris, France (1996), 13 pgs.

(Continued)

*Primary Examiner* — Getente A Yimer
(74) *Attorney, Agent, or Firm* — Intelletek Law Group, PLLC; Gabriel Daniel, Esq.

(57) ABSTRACT

A method of replicating the volume of stateful-sets by receiving input request types for each container of a number of containers, extracting control flow paths and mapping the input request types to the extracted control flow paths. The method learns control flow path-to-volume mappings by computing, for each control flow path of the number of control flow paths, (i) one or more associations between the control flow path and one or more volumes and (ii) a nature of access of the one or more volumes. For each pod replica a dominant control flow path is computed by computing a most common control flow path and a most common volume corresponding to the most common control flow path. A request for volume management of an identified most common volume is received and the identified most common volume is replicated or a its view is created.

20 Claims, 7 Drawing Sheets

(56) References Cited

U.S. PATENT DOCUMENTS

| | | |
|---|---|---|
| 2021/0382913 A1 | 12/2021 | Natanzon et al. |
| 2021/0397356 A1* | 12/2021 | Cain ........................ G06F 3/065 |
| 2022/0156112 A1 | 5/2022 | Singh et al. |
| 2022/0206902 A1* | 6/2022 | Hoang .................... G06F 9/541 |
| 2022/0207614 A1* | 6/2022 | McCullough, Jr. .... G06N 5/022 |
| 2022/0374282 A1* | 11/2022 | Caine ................. G06F 9/45558 |
| 2024/0134542 A1* | 4/2024 | Aiouaz ................ G06F 3/0607 |

OTHER PUBLICATIONS

Truyen, E. et al., "Performance Overhead of Container Orchestration Frameworks for Management of Multi-Tenant Database Deployments", SAC, Limassol, Cyprus (2019), 4 pgs.

"A Dynamic Binary Analysis Library", Triton, https://triton-library.github.io/, Retrieved on Mar. 3, 2025, 11 pages.

Kerrisk, M., Linux/UNIX System Programming Training. Retrieved from: https://man7.org/linux/man-pages/man1/strace.1.html, Jun. 30, 2024, 22 pages.

* cited by examiner

VOLUME REPLICATION OF STATEFUL-SETS

BACKGROUND

Technical Field

The present disclosure generally relates to volume replication of stateful-sets using application behavior, and more particularly, to decoupling volumes and reducing locking pressure based on the dynamic behavior and access pattern of workloads.

Description of the Related Art

Container management systems are developed for managing container lifecycle (Create, Read, Update, and Delete (CRUD)) in a cluster-wide system. As an example, once a container creation request is received, a scheduler decides the host where requested containers will run, and then an agent in the host launches the container.

However, the container management systems are not without deficiency. For example, response latency and CPU utilization may increase when the number of client threads increases due to locking pressure on volumes.

SUMMARY

According to an embodiment of the present disclosure a method of replicating the volume of stateful-sets is disclosed. In the method, input requests and corresponding input request types are received and for each container of a number of containers, control flow paths are extracted and mapped to the input request types. The method learns control flow path-to-volume mappings by computing, for each control flow path of the number of control flow paths, (i) one or more associations between the control flow path and one or more volumes and (ii) a nature of access of the one or more volumes. For each pod replica, a dominant control flow path is computed by computing a most common control flow path and a most common volume corresponding to the most common control flow path. A request for volume management of an identified most common volume is received and the identified most common volume is replicated or a view of the identified most common volume is created. This may allow for decisions to be made on if a volume replication is required or not upon the replication of a pod/service that is accessing the volume and thus reduce latency experienced by locks on shared artifacts.

In one embodiment, which may be combined with the previous embodiment, the method computes the dominant control flow path by labeling edges in the control flow paths, obtained from a mapping of the plurality of input request types to the plurality of control flow paths, with volume traffic and volume identification information. In the method, a cluster of paths and a cluster of volumes are generated, the most common path from the cluster of paths is selected and the most common volume corresponding to the selected most common path is selected. The most common path is a closest centroid of the cluster of paths.

In one embodiment, which may be combined with the previous embodiments, the method includes replicating the identified most common volume based on volume management information about a locking pressure. The information may include information that the locking pressure is larger than an inter-pod network latency, a "write" rate is low, and co-occurring "writes" by a number of pods happen.

According to an embodiment of the present disclosure, a computer program product is disclosed. The computer program product includes one or more computer-readable storage devices and program instructions stored on at least one of the one or more tangible storage devices, the program instructions executable by a processor, the program instructions including program instructions to replicate a volume of stateful-sets. The program instructions include program instructions to receive, input requests and corresponding input request types and for each container of a number of containers, extract control flow paths and map the input request types to the extracted control flow paths. The program instruction includes program instructions to learn control flow path-to-volume mappings by computing, for each control flow path of the number of control flow paths, (i) one or more associations between the control flow path and one or more volumes and (ii) a nature of access of the one or more volumes. The program instructions include program instructions to compute for each pod replica a dominant control flow path by computing a most common control flow path and a most common volume corresponding to the most common control flow path. The program instructions include program instructions to receive a request for volume management of an identified most common volume and replicate the identified most common volume or create a view of the identified most common volume. This may allow for decisions to be made on if a volume replication is required or not upon the replication of a pod/service that is accessing the volume and thus reduce latency experienced by locks on shared artifacts.

In one embodiment, which may be combined with the previous embodiment, computer program product comprises program instructions computes the dominant control flow path by labeling edges in the control flow paths, obtained from a mapping of the plurality of input request types to the plurality of control flow paths, with volume traffic and volume identification information. The program instructions generate a cluster of paths and a cluster of volumes, select the most common path from the cluster of paths and select the most common volume corresponding to the selected most common path. The most common path is a closest centroid of the cluster of paths.

In one embodiment, which may be combined with the previous embodiments, the program instructions replicate the identified most common volume based on volume management information about a locking pressure. The information may include information that the locking pressure is larger than an inter-pod network latency, a "write" rate is low, and co-occurring "writes" by a number of pods happen.

According to an embodiment of the present disclosure, a non-transitory computer-readable storage medium is disclosed. The non-transitory computer-readable storage medium tangibly embodies a computer readable program code having computer readable instructions that, when executed, causes a processor to receive input requests and corresponding input request types and for each container of a set of containers, extract control flow paths and map the input request types to the extracted control flow paths. The non-transitory computer-readable storage medium further causes the processor to learn control flow path-to-volume mappings by computing, for each control flow path of the number of control flow paths, (i) one or more associations between the control flow path and one or more volumes and (ii) a nature of access of the one or more volumes. The processor computes for each pod replica a dominant control flow path by computing a most common control flow path and a most common volume corresponding to the most common control flow path. The processor receives a request for volume management of an identified most common volume and replicates the identified most common volume or create a view of the identified most common volume. This may allow for decisions to be made on if a volume replication is required or not upon the replication of a pod/service that is accessing the volume and thus reduce latency experienced by locks on shared artifacts.

In one embodiment, which may be combined with the previous embodiment, the non-transitory computer-readable storage medium further causes the processor to compute the dominant control flow path by labeling edges in the control flow paths, obtained from a mapping of the plurality of input request types to the plurality of control flow paths, with volume traffic and volume identification information. The program instructions generate a cluster of paths and a cluster of volumes, select the most common path from the cluster of paths and select the most common volume corresponding to the selected most common path. The most common path is a closest centroid of the cluster of paths. These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Overview

Figure 1:
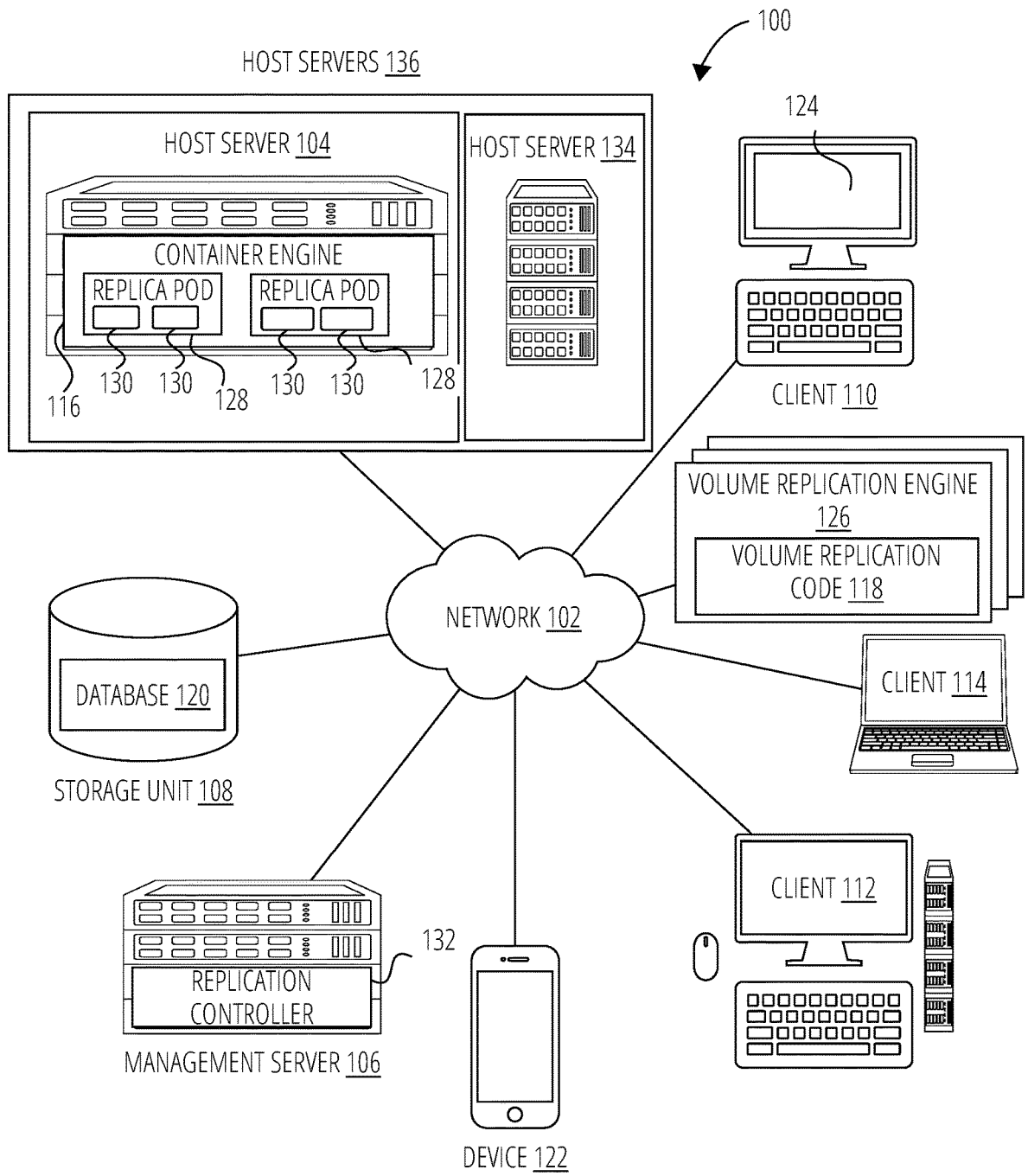
FIG. 1 depicts a block diagram of a network of data processing systems in accordance with an illustrative embodiment.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

In cloud environments, compute, network and storage resources are typically offered as commodities on demand. Cloud tenants may request these resources through a cloud management system (CMS), which may monitor the availability of the resources and provision of resources to the tenants. Agents running on cloud servers may be used to monitor available resources and to inform the CMS. The CMS may keep track of the available resources (e.g., CPU, Memory, disk, network bandwidth) and admit requests when the desired resources are available.

Admission control may be used in cloud management systems to accept or reject resource requests based on criteria like resource availability, system health, desired quality of service (QoS) and security concerns. Typically, the admission control may represent the validation process to check whether the cloud system has sufficient current resources, known and unknown, to serve an incoming request. These requests may include, but are not limited to, requests to provision virtualized resources such as virtual machines, virtual storage, virtual networks, etc., and requests of starting applications, containers, services, etc. In container cloud, the requests may be container requests and each container request may run different container images with operational states of containers being related to their images as well. Containers on the same worker may share the same operating system kernel, thus the resource limitations in the kernel may be inherited in the containers. Further in a container cloud management system like Kubernetes Docker Swarm, the tenant may specify the required resources for a container in terms of CPU and memory. The terms "Kubernetes" and "Docker" may be subject to trademark rights in various jurisdictions throughout the world and are used here only in reference to the products or services properly denominated by the marks to the extent that such trademark rights may exist.

Kubernetes is an open-source container-orchestration system for automating deployment, scaling and management of containerized applications across clusters of hosts. Kubernetes may provide a platform for automating deployment, scaling, and operations of application containers across clusters of hosts. Kubernetes works with a range of container tools, including Docker. Kubernetes may be used to manage containers, by deploying containers (i.e., workloads) to a plurality of nodes (e.g., a physical machine or virtual machine), creating more or less replicas of a container than is available, restarting a container that gets killed, moving a container from one node to another, etc. A container may be encapsulated in a pod, the pod being an abstraction that represents a group of one or more application containers such as Docker that work together and therefore are logically grouped, and some shared resources for those containers, the shared resources including for example, shared storage (referred to herein as volumes), networking, as a unique cluster IP address, and information about how to run each container, such as the container image version or specific ports to use.

It is recognized however, that response latency and CPU utilization may increase when the number of client threads increases due to locking pressure on volumes.

The illustrative embodiments disclose a mechanism to decouple volumes and reduce locking pressure based on the dynamic behavior and access pattern of computational workloads (containers). This may help workloads regulate their QoS accordingly. More specifically, the illustrative embodiments disclose a method comprising receiving a plurality of input request types and for each container of a plurality of containers, extracting a plurality of control flow paths and mapping the plurality of input request types to the plurality of control flow paths. The method also comprises learning control flow path-to-volume mappings by computing, for each for each control flow path of the plurality of control flow paths, (i) one or more associations between the control flow path and one or more volumes and (ii) a nature of access of the one or more volumes. For each pod replica, a dominant control flow path is computed by computing a most common control flow path and a most common volume corresponding to the most common control flow path. Upon receiving a request for volume management of an identified most common volume, the identified most common volume may be replicated or one or more views may be created on the identified most common volume for pod sharing.

Certain operations are described as occurring at a certain component or location in an embodiment. Such locality of operations is not intended to be limiting on the illustrative embodiments. Any operation described herein as occurring at or performed by a particular component, can be implemented in such a manner that one component-specific function causes an operation to occur or be performed at another component, e.g., at a local or remote engine respectively. A method of an embodiment described herein, when implemented to execute on a device or data processing system, comprises substantial advancement of the functionality of that device or data processing system by enabling the decoupling of volumes and reduction of locking pressure based on the dynamic behavior and access pattern of workloads.

The illustrative embodiments are described with respect to certain types of data, functions, algorithms, equations, model configurations, locations of embodiments, additional data, devices, data processing systems, environments, components, and applications only as examples. Any specific manifestations of these and other similar artifacts are not intended to be limiting to the disclosure. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the disclosure, either locally at a data processing system or over a data network, within the scope of the disclosure. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the disclosure within the scope of the disclosure. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

With reference to the figures and in particular with reference to FIG. 1 these figures are example diagrams of data processing environments in which illustrative embodiments may be implemented. FIG. 1 is only an example and is not intended to assert or imply any limitation with regard to the environments in which different embodiments may be implemented. A particular implementation may make many modifications to the depicted environments based on the following description.

Data Processing Environment

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Host servers 136 (host server 104, host server 134) and management server 106 couple to network 102 along with storage unit 108. Software applications may execute on any computer in data processing environment 100. Client 110, client 112, client 114 are also coupled to network 102. A data processing system, such as host servers 136 or management server 106, or clients (client 110, client 112, client 114) may include data and may have software applications or software tools executing thereon. Host servers 136 may include one or more GPUs (graphics processing units) for training one or more models.

Only as an example, and without implying any limitation to such architecture, FIG. 1 depicts certain components that are usable in an example implementation of an embodiment. For example, servers and clients are only examples and not to imply a limitation to a client-server architecture. As another example, an embodiment can be distributed across several data processing systems and a data network as shown, whereas another embodiment can be implemented on a single data processing system within the scope of the illustrative embodiments. Data processing systems (host servers 136, management server 106, client 110, client 112, client 114) also represent example nodes in a cluster, partitions, and other configurations suitable for implementing an embodiment.

Host servers 136, management server 106, storage unit 108, client 110, client 112, client 114, device 122 may couple to network 102 using wired connections, wireless communication protocols, or other suitable data connectivity. Client 110, client 112 and client 114 may be, for example, personal computers or network computers.

In the depicted example, host servers 136 may provide data, such as boot files, operating system images, and applications to client 110, client 112, and client 114. Client 110, client 112 and client 114 may be clients to host servers 136 in this example. Client 110, client 112 and client 114 or some combination thereof, may include their own data, boot files, operating system images, and applications. Data processing environment 100 may include additional servers, clients, and other devices that are not shown. Host servers 136 include a container engine 116 that may be configured to implement one or more of the functions described herein in accordance with one or more embodiments.

Host servers 136 may be a collection of one or more host servers that comprise one or more pods 128. In embodiments, a pod 128 encapsulates one or more application containers, storage resources, a unique network IP, and options that govern how the container(s) within the pod should run. For example, pod 128 is representative of a Kubernetes pod. In general, a pod represents a single instance of an application. In embodiments of the disclosure, replica pods may be scaled horizontally, such that each replica pod represents a separate instance of the same application. Accordingly, the containers within each replica pod may be identical. In some embodiments, a pod includes a single application container. In some embodiments, a pod includes two or more application containers that share resources and act as a single manageable entity (i.e., multiple application containers within a single pod are logically grouped). While reference is made to Kubernetes and/or Kubernetes-specific elements, it should be understood that aspects of the present disclosure may be applied equally to other automated programs for deploying, scaling, and operating application containers.

In embodiments of the disclosure, the management server 106 may have a program configured to manage containerized applications across a cluster of nodes, such as host servers 104. In some embodiments, the management server 106 manages containerized applications on a single node and may include replica replication controller 132. Replica replication controller 132 may generate replica pods from a pod template. A pod template defines the application container(s), storage resources, and rules that govern how the container(s) should run. As such, containers within a pod may be automatically co-located and co-scheduled on the same physical (or virtual) machine, such as host servers 136.

In embodiments of the disclosure, replication controller 132 ensures that the number of replica pods defined for a service matches the number of currently deployed pods. In other words, replica replication controller 132 maintains a desired number of copies. For example, if a container in a pod temporarily goes down, replication controller 132 may start up an identical copy of the container. However, if the first container comes back online, replication controller 132 may remove one of the duplicate copies. Similarly, if host server 104 fails, replica controller may replace replica pods in host server 104 by scheduling identical replacements of replica pods on host server 134.

Device 122 is an example of a device described herein. For example, device 122 can take the form of a smartphone, a tablet computer, a laptop computer, client 110 in a stationary or a portable form, a wearable computing device, or any other suitable device. Any software application described as executing in another data processing system in FIG. 1 can be configured to execute in device 122 in a similar manner. Any data or information stored or produced in another data processing system in FIG. 1 can be configured to be stored or produced in device 122 in a similar manner. Database 120 of storage unit 108 may be or include one or more input request data stored in repositories for computations herein.

Volume replication engine 126 may implement an embodiment described herein. Volume replication engine 126 may be separate from or part of any data processing system or computing environment discussed herein. Volume replication engine 126 may include volume replication code 118 that may use data from storage unit 108 for volume replication of stateful-sets as described herein. Volume replication engine 126 can also obtain data or requests from any client for volume management. Volume replication engine 126 can also execute in any of data processing systems (host server 104 or management server 106, client 110, client 112, client 114). For example, volume replication engine 126 is embodied as client application 124.

The data processing environment 100 may also be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service-oriented architecture where interoperable software components distributed across a network may be packaged together as coherent business applications. Data processing environment 100 may also take the form of a cloud and employ a cloud computing model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 200 includes an example of an environment for the execution of at least some of the computer code involved in performing the inventive methods, such as volume replication code 118. In addition to volume replication code 118, computing environment 200 includes, for example, computer 202, wide area network 228 (WAN), end user device 230 (EUD), remote server 232, public cloud 240, and private cloud 236. In this embodiment, computer 202 includes processor set 204 (including processing circuitry 206 and cache 208), communication fabric 210, volatile memory 212, persistent storage 214 (including operating system 216 and volume replication code 118, as identified above), peripheral device set 218 (including user interface (UI) device set 220, storage 222, and Internet of Things (IOT) sensor set 224), and network module 226. Remote server 232 includes remote database 234. Public cloud 240 includes gateway 238, cloud orchestration module 242, host physical machine set 246, virtual machine set 244, and container set 248.

Figure 2:
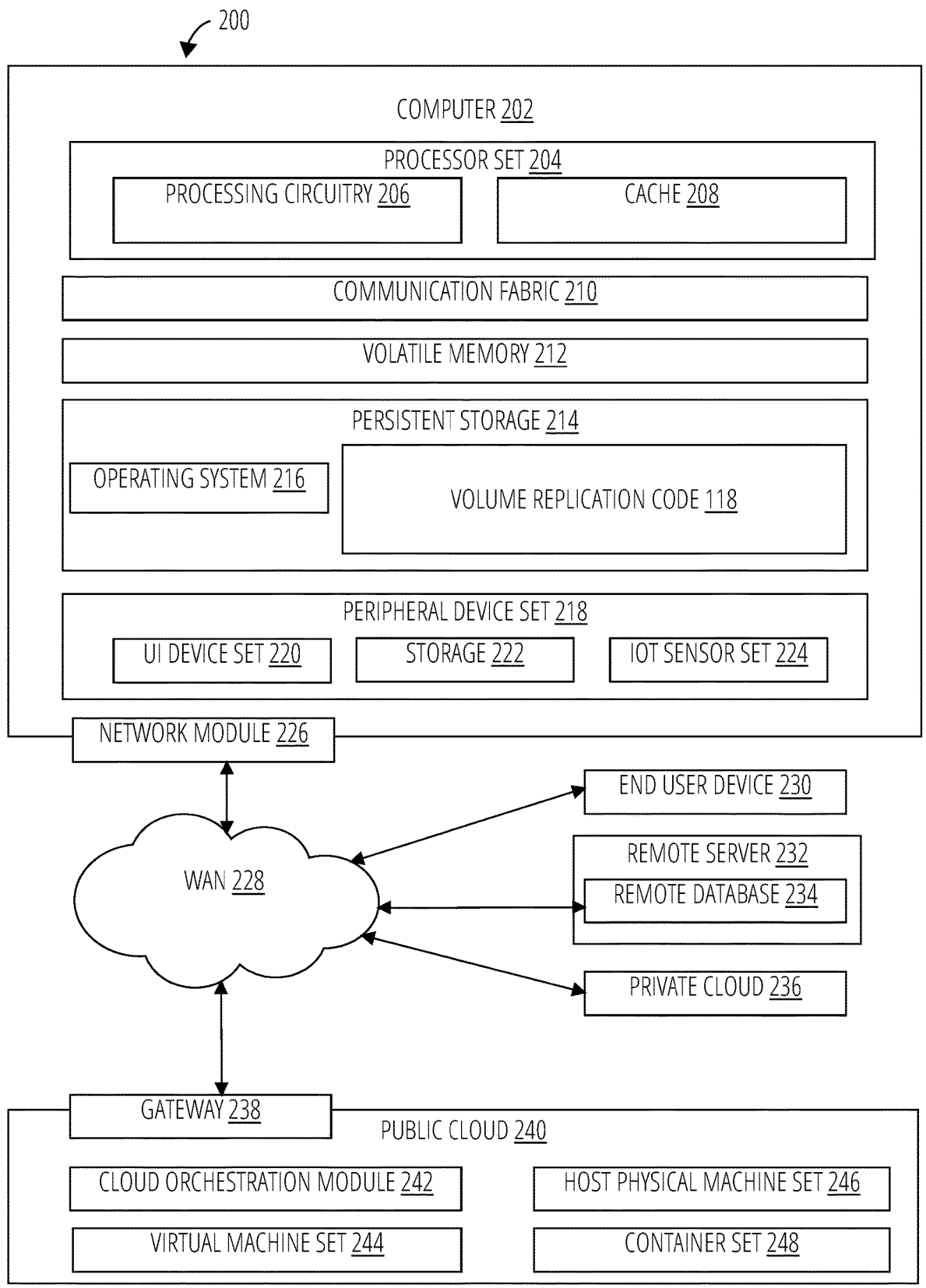
FIG. 2 depicts a block diagram of a particularly configured computing device in a computing environment in accordance with illustrative embodiments.

COMPUTER 202 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 234. As is well understood in the art of computer technology, and depending upon the technology, performance of a computer-implemented method may be distributed among multiple computers and/or between multiple locations. On the other hand, in this presentation of computing environment 200, detailed discussion is focused on a single computer, specifically computer 202, to keep the presentation as simple as possible. Computer 202 may be located in a cloud, even though it is not shown in a cloud in FIG. 2. On the other hand, computer 202 is not required to be in a cloud except to any extent as may be affirmatively indicated.

PROCESSOR SET 204 includes one, or more, computer processors of any type now known or to be developed in the future. Processing circuitry 206 may be distributed over multiple packages, for example, multiple, coordinated integrated circuit chips. Processing circuitry 206 may implement multiple processor threads and/or multiple processor cores. Cache 208 is memory that is located in the processor chip package(s) and is typically used for data or code that should be available for rapid access by the threads or cores running on processor set 204. Cache memories are typically organized into multiple levels depending upon relative proximity to the processing circuitry. Alternatively, some, or all, of the cache for the processor set may be located "off chip." In some computing environments, processor set 204 may be designed for working with qubits and performing quantum computing.

Computer readable program instructions are typically loaded onto computer 202 to cause a series of operational steps to be performed by processor set 204 of computer 202 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 208 and the other storage media discussed below. The program instructions, and associated data, are accessed by processor set 204 to control and direct performance of the inventive methods. In computing environment 200, at least some of the instructions for performing the inventive methods may be stored in volume replication code 118 in persistent storage 214.

COMMUNICATION FABRIC 210 is the signal conduction path that allows the various components of computer 202 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 212 is any type of volatile memory now known or to be developed in the future. Examples include dynamic type random access memory (RAM) or static type RAM. Typically, volatile memory 212 is characterized by random access, but this is not required unless affirmatively indicated. In computer 202, the volatile memory 212 is located in a single package and is internal to computer 202, but, alternatively or additionally, the volatile memory may be distributed over multiple packages and/or located externally with respect to computer 202.

PERSISTENT STORAGE 214 is any form of non-volatile storage for computers that is now known or to be developed in the future. The non-volatility of this storage means that the stored data is maintained regardless of whether power is being supplied to computer 202 and/or directly to persistent storage 214. Persistent storage 214 may be a read only memory (ROM), but typically at least a portion of the persistent storage allows writing of data, deletion of data and re-writing of data. Some familiar forms of persistent storage include magnetic disks and solid state storage devices. Operating system 216 may take several forms, such as various known proprietary operating systems or open source Portable Operating System Interface-type operating systems that employ a kernel. The code included in volume replication code 118 typically includes at least some of the computer code involved in performing the inventive methods.

Peripheral device set 218 includes the set of peripheral devices of computer 202. Data communication connections between the peripheral devices and the other components of computer 202 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 220 may include components such as a display screen, speaker, microphone, wearable devices (such as goggles and smart watches), keyboard, mouse, printer, touchpad, game controllers, and haptic devices. Storage 222 is external storage, such as an external hard drive, or insertable storage, such as an SD card. Storage 222 may be persistent and/or volatile. In some embodiments, storage 222 may take the form of a quantum computing storage device for storing data in the form of qubits. In embodiments where computer 202 is required to have a large amount of storage (for example, where computer 202 locally stores and manages a large database) then this storage may be provided by peripheral storage devices designed for storing very large amounts of data, such as a storage area network (SAN) that is shared by multiple, geographically distributed computers. IoT sensor set 224 is made up of sensors that can be used in Internet of Things applications. For example, one sensor may be a thermometer and another sensor may be a motion detector.

Network module 226 is the collection of computer software, hardware, and firmware that allows computer 202 to communicate with other computers through WAN 228. Network module 226 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 226 are performed on the same physical hardware device. In other embodiments (for example, embodiments that utilize software-defined networking (SDN)), the control functions and the forwarding functions of network module 226 are performed on physically separate devices, such that the control functions manage several different network hardware devices. Computer readable program instructions for performing the inventive methods can typically be downloaded to computer 202 from an external computer or external storage device through a network adapter card or network interface included in network module 226.

WAN 228 is any wide area network (for example, the internet) capable of communicating computer data over non-local distances by any technology for communicating computer data, now known or to be developed in the future. In some embodiments, the WAN 228 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 230 is any computer system that is used and controlled by an end user (for example, a customer of an enterprise that operates computer 202), and may take any of the forms discussed above in connection with computer 202. EUD 230 typically receives helpful and useful data from the operations of computer 202. For example, in a hypothetical case where computer 202 is designed to provide a recommendation to an end user, this recommendation would typically be communicated from network module 226 of computer 202 through WAN 228 to EUD 230. In this way, EUD 230 can display, or otherwise present, the recommendation to an end user. In some embodiments, EUD 230 may be a client device, such as thin client, heavy client, mainframe computer, desktop computer and so on.

Remote server 232 is any computer system that serves at least some data and/or functionality to computer 202. Remote server 232 may be controlled and used by the same entity that operates computer 202. Remote server 232 represents the machine(s) that collect and store helpful and useful data for use by other computers, such as computer 202. For example, in a hypothetical case where computer 202 is designed and programmed to provide a recommendation based on historical data, then this historical data may be provided to computer 202 from remote database 234 of remote server 232.

Public cloud 240 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 240 is performed by the computer hardware and/or software of cloud orchestration module 242. The computing resources provided by public cloud 240 are typically implemented by virtual computing environments that run on various computers making up the computers of host physical machine set 246, which is the universe of physical computers in and/or available to public cloud 240. The virtual computing environments (VCEs) typically take the form of virtual machines from virtual machine set 244 and/or containers from container set 248. It is understood that these VCEs may be stored as images and may be transferred among and between the various physical machine hosts, either as images or after instantiation of the VCE. Cloud orchestration module 242 manages the transfer and storage of images, deploys new instantiations of VCEs and manages active instantiations of VCE deployments. Gateway 238 is the collection of computer software, hardware, and firmware that allows public cloud 240 to communicate through WAN 228.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 236 is similar to public cloud 240, except that the computing resources are only available for use by a single enterprise. While private cloud 236 is depicted as being in communication with WAN 228, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 240 and private cloud 236 are both part of a larger hybrid cloud.

Figure 3A:
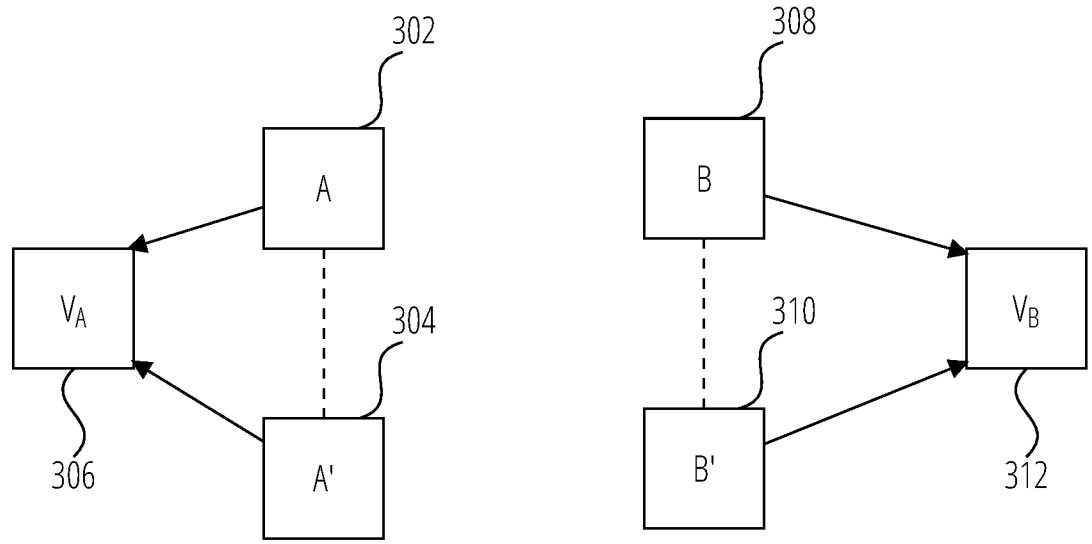
FIG. 3A depicts a block diagram illustrating replica-sets in accordance with an illustrative embodiment.
Figure 3B:
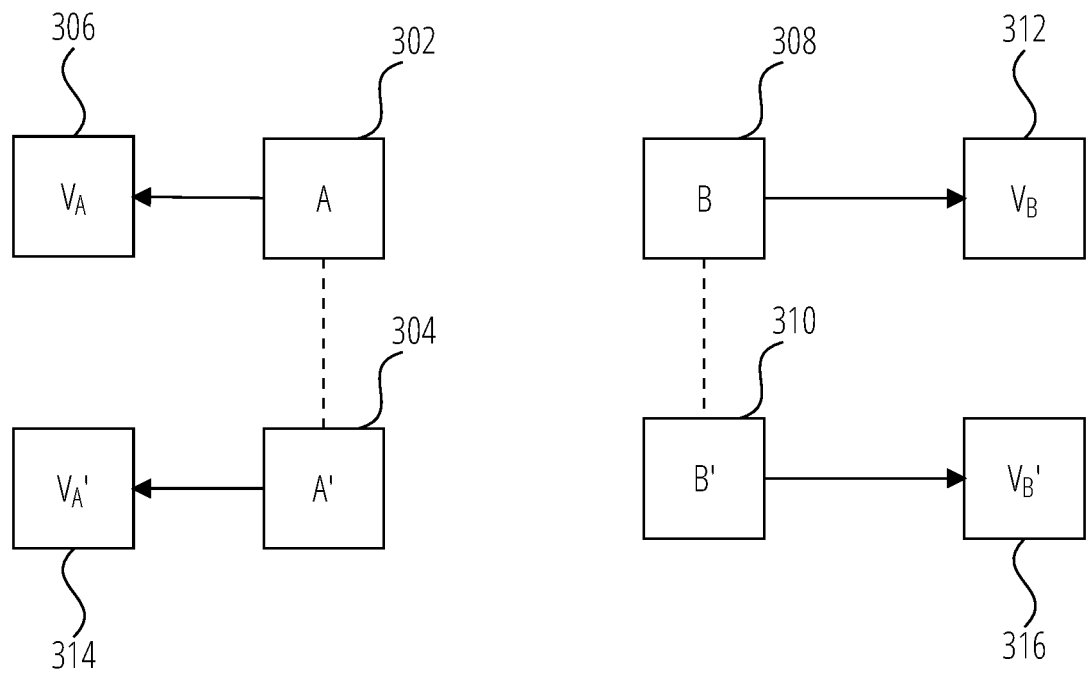
FIG. 3B depicts a block diagram illustrating stateful-sets in accordance with an illustrative embodiment.

Turning now to FIG. 3A-FIG. 3B, block diagrams are shown to illustrate replica-sets and stateful-sets respectively. As shown in FIG. 3A, consider two services, service A and service B in pod A 302 and pod B 308, respectively. Pod A 302 is be replicated to pod A' 304 and pod B 308 is replicated to pod B' 310. Pod A 302 and pod A' 304 refer to the same volume, volume VA 306, if they are replica sets. Similarly pod B 308 and pod B' 310 refer to the same volume, volume VB 312 if they are replica sets. It will be observed that volume VA 306 doesn't get replicated as pod A gets replicated to pod A'. Similarly, VB doesn't get replicated as pod B 308 gets replicated to pod B' 310. Further, as shown in FIG. 3B, consider two services, service A and service B in pod A 302 and pod B 308 respectively. Pod A 302 is be replicated to pod A' 304 and pod B 308 is replicated to pod B' 310. Pod A 302 refers to the volume VA 306 and pod A' 304 refers to the volume VA' 314, if pod A 302 and pod A' 304 are stateful-sets. Similarly, pod B 308 refers to the volume VB 312 and pod B' 310 refers to the volume VB' 316, if pod B 308 and pod B' 310 are stateful-sets. Thus, it will be observed that Volume VA 306 gets replicated to volume VA' 314 as pod A 302 gets replicated to pod A' 304. Similarly, volume VB 312 gets replicated to volume VB' 316 as pod B 308 gets replicated to pod B' 310.

Figure 4:
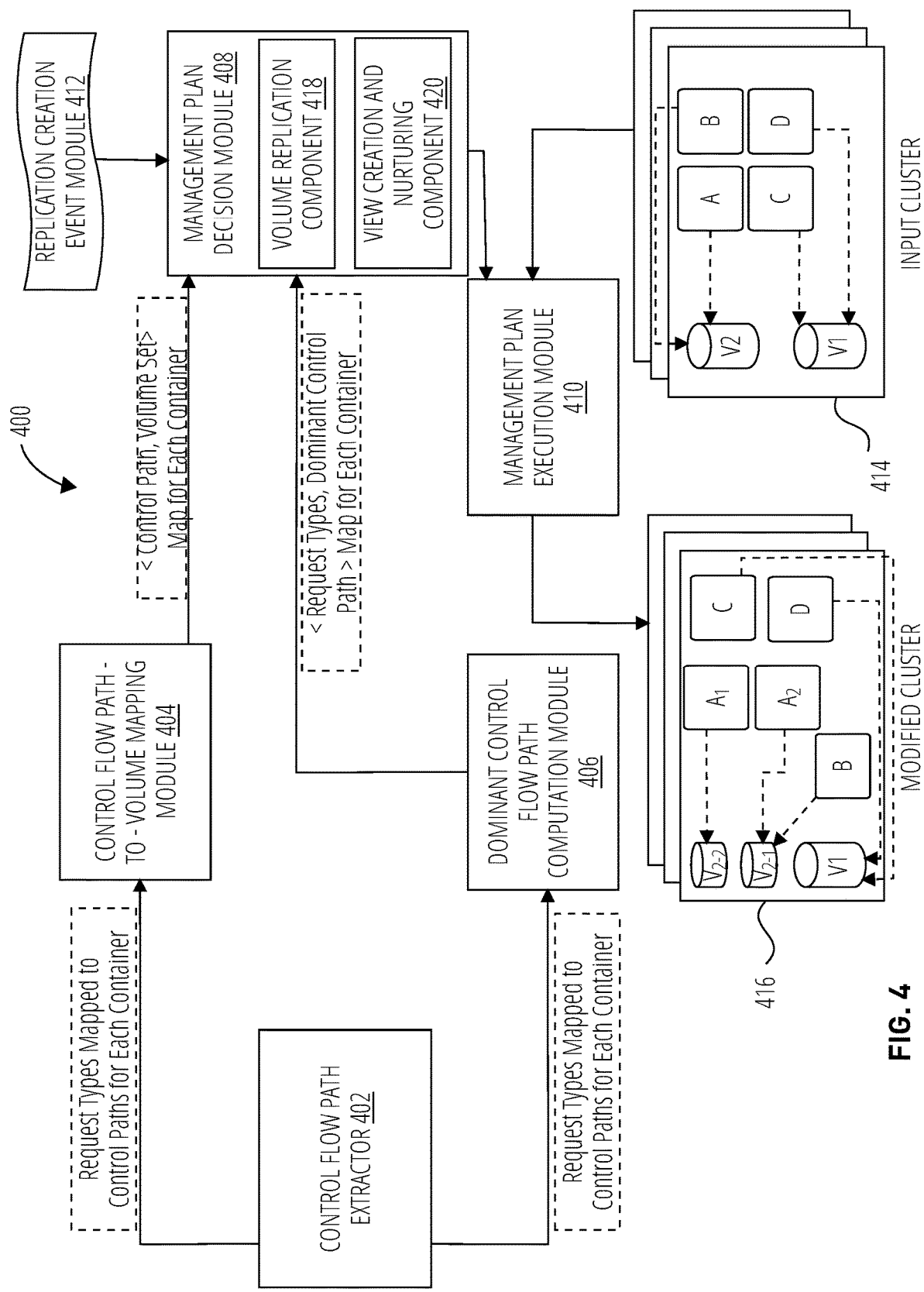
FIG. 4 depicts a system diagram in accordance with an illustrative embodiment.

Turning now to FIG. 4, a system diagram for volume replication of stateful-sets will now be described. The stateful-sets may have to volumes provisioned statically using persistent volumes or volumes provisioned dynamically using storage classes. The system 400 may be or form a part of the volume replication engine 126 of FIG. 1 or may be separate from the volume replication engine 126. The system 400 may be configured to create or merge volumes and/or views within volumes in response to changes to pod replica population based on request traffic types and the resulting activity in pod control flow paths in a container orchestration platform. For example, a plurality of pods may be created for a service (e.g., as a database service like MongoDB or PostgreSQL) and services of the plurality of pods may access the same volume to perform "read" and "write" actions. The access may be coordinated through the application of locks on the volume so that performing "write" functions can be sequential. However, this may inevitably create a locking pressure (latency experienced by locks on shared artifacts). The system 400 may thus be configured to decouple the locking such that when a "write" function is being performed by a first services, other services don't necessarily have to wait for the "write" function to finish executing.

The system 400 may comprise a control flow path extractor 402, a control flow path-to-volume mapping module 404, a dominant control flow path computation module 406, a management plan decision module 408, a management plan execution module 410, a replication creation event module 412, an input cluster 414, and a modified cluster 416.

The control flow path extractor 402 may receive a plurality of input/input requests, each request having an input request type. The control flow path extractor 402 may extract, for each container of a plurality of containers, a plurality of control flow paths and map the plurality of input request types to the plurality of control flow paths. More specifically, a pod 128 may contain a container that contains a running process/program. The program has a control flow and thus a control flow path. The control flow and thus control flow path illustrates the order in which individual statements, instructions or function calls of the program are executed or evaluated. The path in which the control flows is dependent on the input request. Thus, changing the input request may result in a corresponding change in the control flow path. In a Kubernetes application with a plurality of pods 128, the input request may get routed, in a load balancing process, to a different pod 128 each time. Thus, each pod 128 may follow different control flow paths, depending on the input request received. Thus, the control flow path extractor 402 extracts the plurality of control flow paths and maps them to different requests. The mapping may be achieved by classifying the different control flow paths according to the most frequently occurring paths for each input request type. The control flow paths may be extracted using existing techniques such as the Efficient Path Profiling. Responsive to extracting the control flow paths, the control flow path extractor 402 may map the input request types to the extracted control flow paths.

In traversing a control flow path, volumes may be accessed. For example, there may be "read" and/or "write" functions performed in one or more of the control flow paths. The control flow path-to-volume mapping module 404 may map, based on an analysis of the volume operations of a control flow path, the control flow paths to the volume operations. The analysis may comprise logging the associations between control flow paths and volumes accessed and the nature of access such as volume of "reads" and "writes" and the artifacts accessed. Based on the analysis, a control path-to-volume set mapping may be produced for each container. In an embodiment, "reads", "writes" and the artifacts accessed may be tracked using the FUSE (Filesystem in Userspace) layer.

Since each pod 128 may follow a plurality of different control flow paths, the dominant control flow path computation module 406 may, for each pod 128, compute a dominant control flow path (i.e., the most commonly used control flow path) of the pod 128 and a most common volume corresponding to the most commonly used control flow path. For example, the dominant control flow path computation module 406 may determine that for a first pod replica, a first identified control flow path may be followed the greatest number of times and comparatively more "reads" than "writes" may be performed or vice versa.

Figure 5:
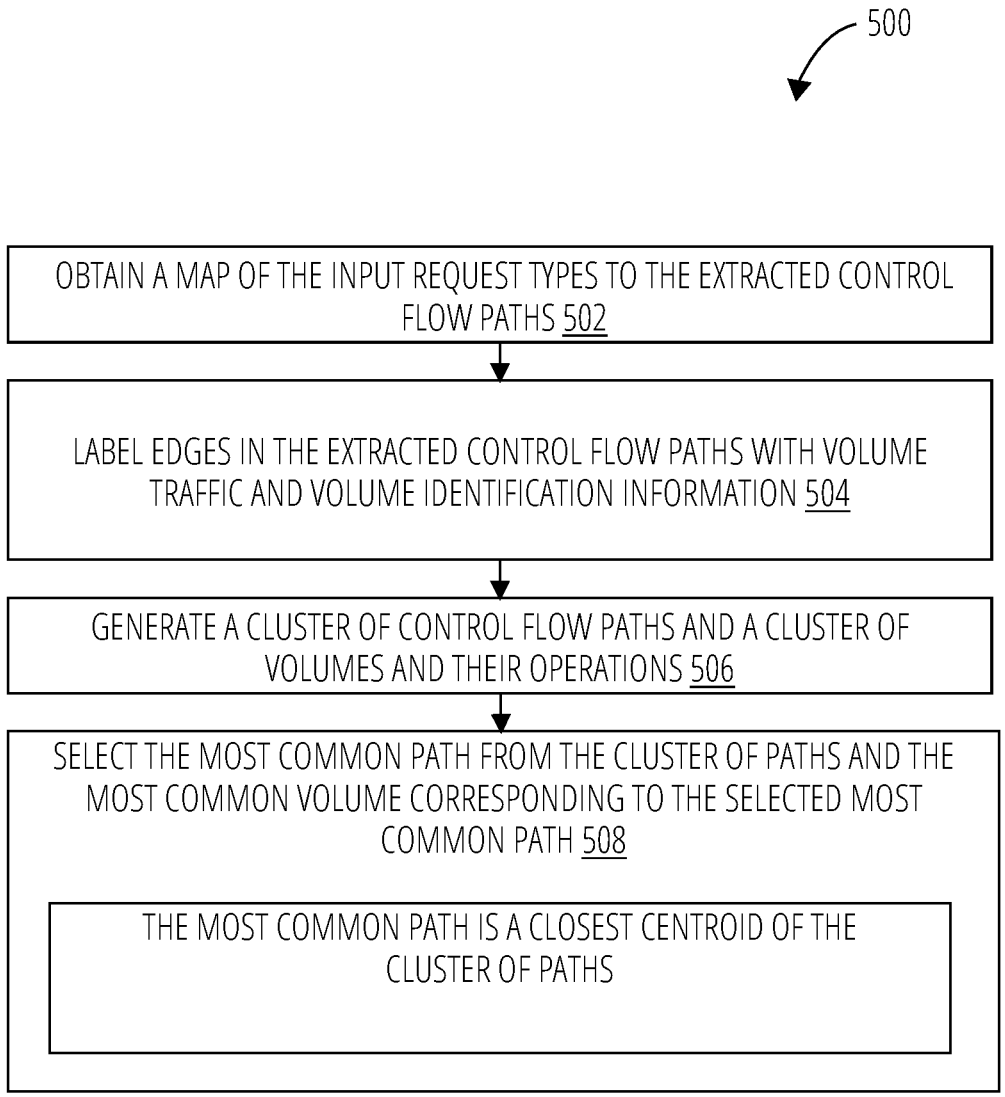
FIG. 5 depicts a routine in accordance with an illustrative embodiment.

Computation of the dominant control flow path of pods may comprise performing the routine 500 of FIG. 5. Although the routine 500 depicts a particular sequence of operations, the sequence may be altered without departing from the scope of the present disclosure. For example, some of the operations depicted may be performed in parallel or in a different sequence that does not materially affect the function of the routine 500. In other examples, different components of an example device or system that implements the routine 500 may perform functions at substantially the same time or in a specific sequence. The routine 500 comprises obtaining, by the dominant control flow path computation module 406, the map of the input request types to the extracted control flow paths as shown in block 502. The map may be updated to remove entries that map the input request types to less important control flow paths. In block 504, edges of the extracted control flow paths are labelled with volume traffic and volume identification information. The dominant control flow path computation module 406 generates, in block 506 a (1) cluster of control flow paths and (2) a cluster of volumes and their operations. The dominant control flow path computation module 406 then selects the most common path from the cluster of paths and the most common volume corresponding to the selected most common path at block 508. In an aspect herein, the most common path is a closest centroid of the cluster of paths).

Turning back to FIG. 4, the system 400 is further described. A replication creation event may be performed by a replication creation event module 412. The replication creation event may correspond to re-deployment of a stateful-set to increase the number of replicas for one or more pods. The system 400 further comprises a management plan decision module 408. Responsive to receiving a request for volume management from, for example, a replication creation event module 412, the management plan decision module 408 performs a management of volumes. More specifically, the management plan decision module 408 creates a volume management plan by analyzing a plurality of pods (e.g., all the pod control paths and pod replicas) and computes the volumes accessed by the pod control paths and the actions performed by the pods such as "reads" and "writes" by different pods on the same volume. Responsive to determining that different pods perform a "read" and a "write" on the same volume, the actions performed on the volume may be delinked. For example, when a number of pods determined to be performing a "read" satisfies a defined threshold criterion (such as a majority threshold criterion), a copy of the volume may not be needed, as the volume may not be locked for reading actions performed don the volume. However, when the number of pods performing a "write" is determined to satisfy a defined threshold criterion (such as a majority threshold criterion or a rate of "write" criterion), one or more copies and/or views of the volume may be created and synchronized as discussed herein. The creation of the copies may be planned by the volume replication component 418 and the creation of the views may be planned by the view creation and nurturing component 420.

Pods of a stateful-set access the volumes. To achieve higher throughput and high availability, the volumes may be replicated. Hence, volume replication may take place in conjunction with stateful-sets. Volume replication component 418 plans volume replication based on an evaluation of one or more criteria including, for example, whether the volume receives mostly "reads" from all replicas, in which case the volume replication component 418 may plan, for example, for the volume to not be replicated. Another example criterion includes evaluating whether the volume gets "reads" for a subset of input request types, and "writes" from other input request types and whether these "reads" and "writes" are different artifacts of the same volume. In this case, the volume replication component 418 may plan, for example, for a shared replica to be created for the subset of replicas which have predominantly read-request types. Another example criterion may include determining whether a locking pressure is more than the inter-pod network latency, but the "write" rates are low (e.g., 10 writes per second or less) yet co-occurring "writes" by multiple pods happen, in which case, the volume replication component 418 may, for example, replicate volumes receiving "writes" as synchronizing it is faster.

View creation and nurturing component 420 may plan for view creation and nurturing based on evaluation of one or more criteria including, for example, whether a plurality of pods share one or more artifacts, in which case different views may be created on the same volume for the pods that share the artifacts and updates may be synchronized between different views. Another example criterion includes evaluating whether views share common areas of data, wherein the views may be merged to reduce redundant updates during synchronization. Further, If the view sizes start growing and reach a size (such as a predetermined size) where volume failure could result in high non-availability of participating pods, the view may be relocated as an independent volume. Relocation may be anticipated and planned ahead by preparing a volume copy with the view using techniques like pre-caching and lazy pulling in co-ordination with FUSE layer.

The management plan to perform one or more of creating/sharing views, creating/sharing volumes, merging views, and merging volumes may be executed by the management plan execution module 410 wherein corresponding pod replicas may be relinked to change volume population. Herein, an input cluster, for example input cluster 414 comprising pods A, B, C, D and two volumes (V1 and V2) with associated pod to volume dependencies shown in dashed lines may be modified to a modified cluster such as modified cluster 416 which may comprise pods A1, A2, B, C, D and three volumes (V1, V2-1, and V2-2) with associated pod to volume dependencies shown in dashed lines. Thus, pod A is replicated to pods A1 and A2 and volume V2 is replicated to volumes V2-1 and V2-2. More specifically, as pod A is replicated (represented by A1 and A2), there is a corresponding replication of volume V2 (represented by V2-1 and V2-2). Methods described herein may determine that pod B be configured to depend on V2-1 (rather than V2-2).

Figure 6C:
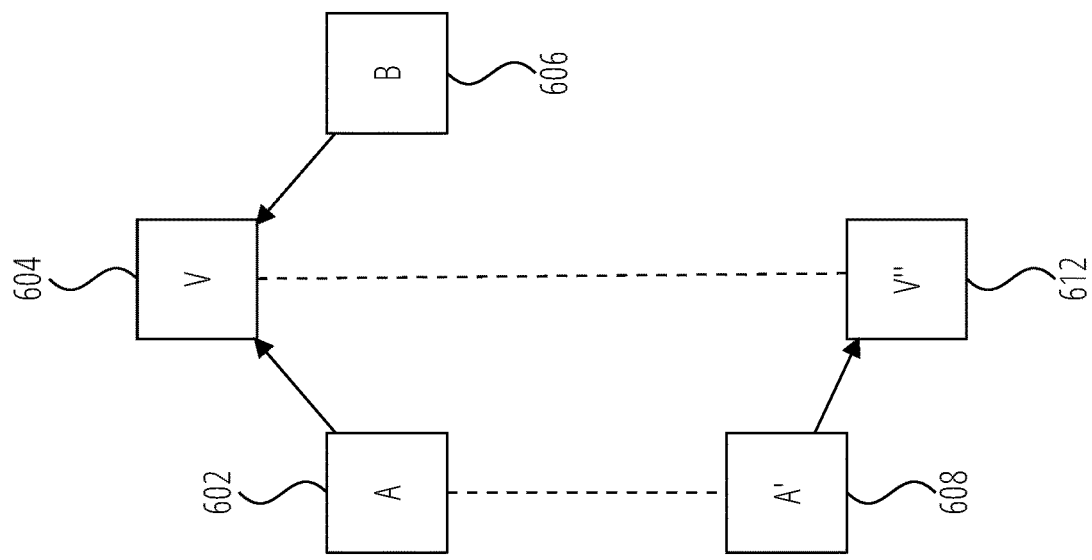
FIG. 6C depicts a block diagram of a view creation replication of a volume in accordance with an illustrative embodiment.
Figure 6B:
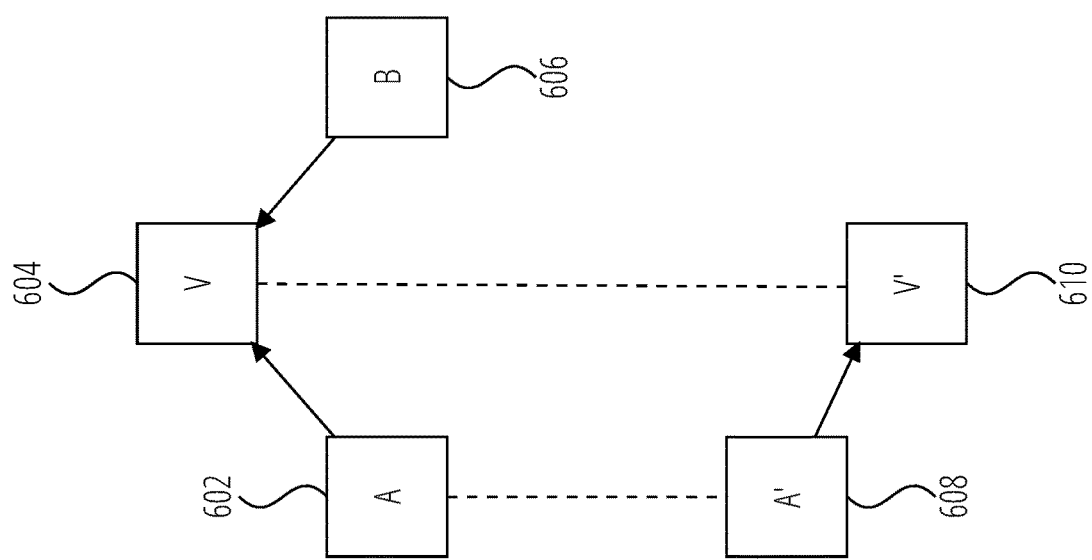
FIG. 6B depicts a block diagram of a snapshot replication of a volume in accordance with an illustrative embodiment.
Figure 6A:
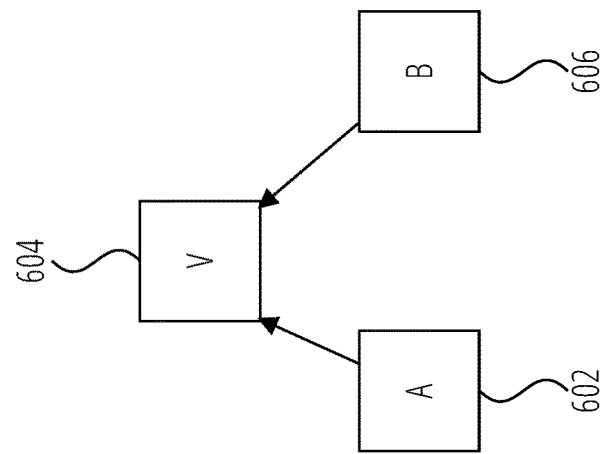
FIG. 6A depicts a block diagram of services sharing a volume in accordance with an illustrative embodiment.

Turning now to FIG. 6A-FIG. 6C, an example management plan performed by management plan decision module 408 is illustrated. FIG. 6A illustrates an initial setting comprising two services A and B corresponding to pod A 602 and pod B 606 respectively. The services may share the same volume V 604. As shown in FIG. 6B and FIG. 6C, the management plan decision module 408 may be tasked with evaluating whether volume V 604 should get replicated when service A and pod A 602 are replicated to A'. The management plan decision module 408 may determine that if volume V 604 gets replicated fully, then the contents of volume V 604 that belong to the service B also get replicated which may not be necessary for service B. However, if volume V 604 is not replicated, then the resource pressure on volume V 604 due to locking/unlocking by the services A, A' and B may degrade the performance. Thus, management plan decision module 408 may decide to either perform a snapshot replication of volume V 604 to volume V' 610 for replica pod A' 608 as shown in FIG. 6B or perform a view creation replication of volume V 604 to volume V'" 612 for replica pod A' 608 as shown in FIG. 6C.

Figure 7:
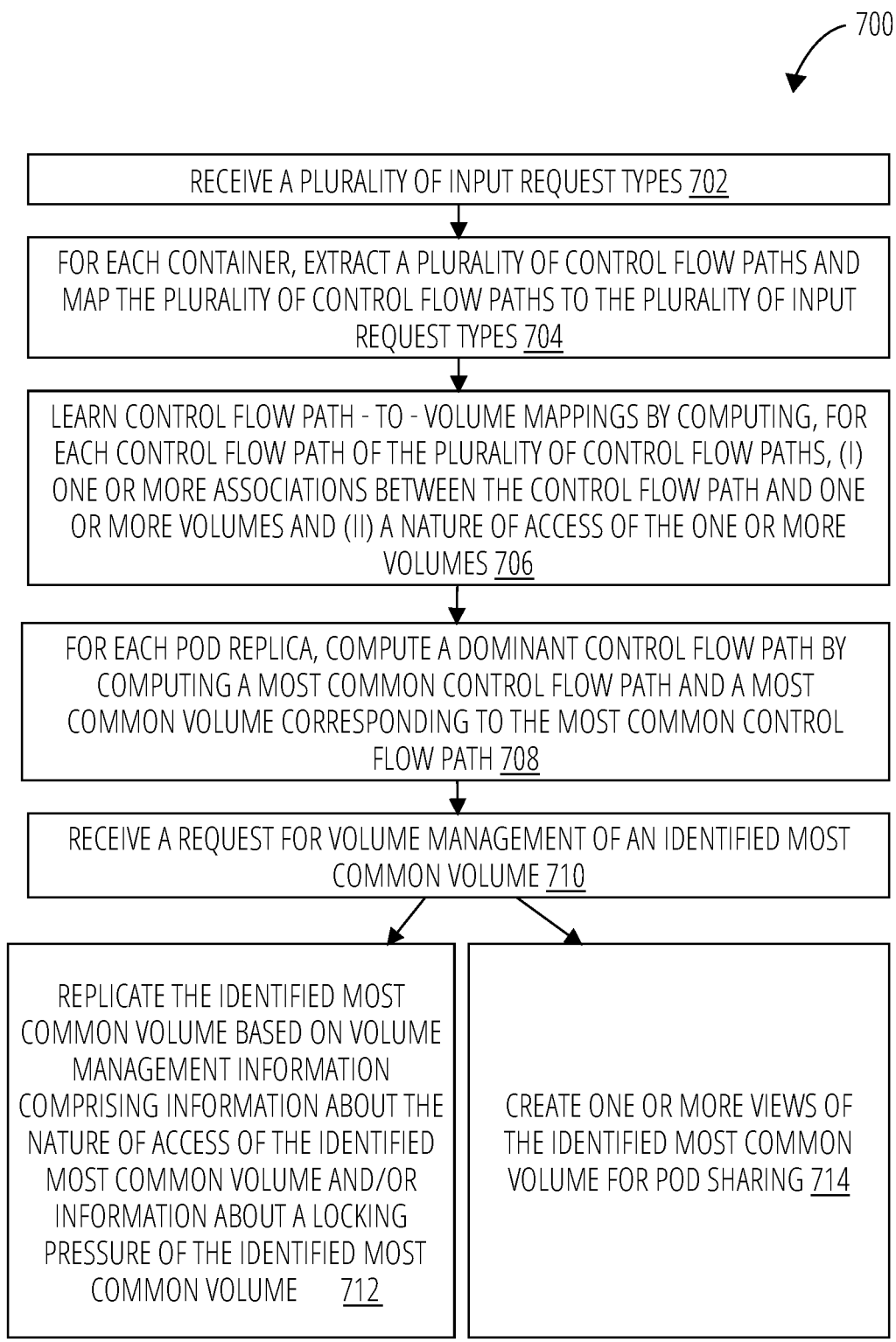
FIG. 7 depicts a routine in accordance with an illustrative embodiment.

FIG. 7 illustrates an example routine 700 for volume replication of stateful-sets. Although the example routine 700 depicts a particular sequence of operations, the sequence may be altered without departing from the scope of the present disclosure. For example, some of the operations depicted may be performed in parallel or in a different sequence that does not materially affect the function of the routine 700. In other examples, different components of an example device or system that implements the routine 700 may perform functions at substantially the same time or in a specific sequence.

According to some examples, the routine may be performed by the volume replication engine 126 and may begin in block 702, there in the volume replication engine 126 receives or obtains via volume replication code 118, a plurality of input request types. In block 704, volume replication engine 126 extracts, for each container, a plurality of control flow paths and maps the plurality of control flow paths to the plurality of input request types. In block 706, volume replication engine 126 learns control flow path-to-volume mappings by computing, for each for each control flow path of the plurality of control flow paths, (i) one or more associations between the control flow path and one or more volumes and (ii) a nature of access of the one or more volumes. In block 708, volume replication engine 126 computes for each pod replica, a dominant control flow path by computing a most common control flow path and a most common volume corresponding to the most common control flow path. In block 710, volume replication engine 126 receiving a request for volume management of one or more identified most common volumes. The request may be based on performing an evaluation of all or a subset of pods. In block 712, volume replication engine 126 plans and replicates the identified most common volume based on volume management information comprising information about the nature of access of the identified most common volume and/or information about a locking pressure of the identified most common volume, or. In block 714, volume replication engine 126 plans and creates one or more views of the identified most common volume for pod sharing.

Conclusion

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computing device comprising:
   a processor;
   a storage device coupled to the processor;
   a code stored in the storage device, wherein an execution of the code by the processor configures the computing device to perform a method, comprising:
   receiving a plurality of input requests and corresponding plurality of input request types;
   for each container of a plurality of containers, extracting a plurality of control flow paths and mapping the plurality of input request types to the plurality of control flow paths;
   learning control flow path-to-volume mappings by computing, for each control flow path of the plurality of control flow paths, (i) one or more associations between the control flow path and one or more volumes and (ii) a nature of access of the one or more volumes;
   for each pod replica, computing a dominant control flow path by computing a most common control flow path and a most common volume corresponding to the most common control flow path, wherein the dominant control path comprises:
   labeling edges in the plurality of control flow paths, obtained from a mapping of the plurality of input request types to plurality of control flow paths, with volume traffic and volume identification information;
   generating a cluster of paths and a cluster of volumes; and
   selecting the most common control flow path from the cluster of paths and the most common volume corresponding to the selected most common control flow path; and
   responsive to receiving a request for volume management of an identified most common volume, reducing a latency by locks on shared artifacts by determining whether a volume replication is warranted for each pod replica, and based on the determination either:
   replicating the identified most common volume based on volume management information comprising information about the nature of access of the identified most common volume and/or information about a locking pressure of the identified most common volume, or
   creating one or more views of the identified most common volume for pod sharing.

2. The computing device of claim 1, wherein the mapping comprises classifying the plurality of control flow paths according to most frequently occurring one or more control flow paths for each request type.

3. The computing device of claim 1, wherein the nature of access comprises a number of reads and/or writes.

4. The computing device of claim 3, further comprising tracking one or more artifacts accessed and the number of reads and/or writes with a FUSE (Filesystem in Userspace) layer.

5. The computing device of claim 1, wherein mapping the plurality of input request types to the plurality of control flow paths comprises classifying the plurality of control flow paths according to most frequently occurring one or more control flow paths for each input request type.

6. The computing device of claim 1, wherein the request for the volume management is generated responsive to a replication creation event.

7. The computing device
   wherein the most common control flow path is a closest centroid of the cluster of paths.

8. The computing device of claim 1, wherein:
   the identified most common volume is replicated based on volume management information about the locking pressure; and
   the volume management information about the locking pressure comprises knowledge that the locking pressure is larger than an inter-pod network latency, knowledge that a write rate is low, and knowledge about a plurality of co-occurring writes by a plurality of pods happening.

9. The computing device of claim 1, wherein the one or more views are created based on the identified most common volume and an update to the identified most common volume is synchronized between the one or more views.

10. The computing device of claim 9, further comprising, responsive to a view size of the one or more views growing beyond a predetermined size, relocating the one or more views.

11. The computing device of claim 1, wherein the one or more views are created, and the one or more views are merged, when the one or more views share common data.

12. A computer program product comprising:
one or more non-transitory computer-readable storage devices and program instructions stored on at least one of the one or more non-transitory computer-readable storage devices, the program instructions executable by a processor, the program instructions comprising:
program instructions to receive a plurality of input requests and corresponding plurality of input request types;
program instructions to extract, for each container, a plurality of control flow paths and mapping the plurality of input request types to the plurality of control flow paths;
program instructions to learn a control flow path-to-volume mappings by computing, for each control flow path of the plurality of control flow paths, (i) one or more associations between the control flow path and one or more volumes and (ii) a nature of access of the one or more volumes;
program instructions to compute, for each pod replica, a dominant control flow path by computing a most common control flow path and a most common volume corresponding to the most common control flow path, wherein the dominant control path comprises:
labeling edges in the plurality of control flow paths, obtained from a mapping of the plurality of input request types to plurality of control flow paths, with volume traffic and volume identification information;
generating a cluster of paths and a cluster of volumes; and
selecting the most common control flow path from the cluster of paths and the most common volume corresponding to the selected most common control flow path; and
program instructions to, responsive to receiving a request for volume management of an identified most common volume, reducing a latency by locks on shared artifacts by determining whether a volume replication is warranted for each pod replica, and based on the determination either:
replicating the identified most common volume based on a volume management information comprising information about the nature of access of the identified most common volume and/or information about a locking pressure of the identified most common volume, or
creating one or more views of the identified most common volume for pod sharing.

13. The computer program product of claim 12, wherein the mapping is based on program instructions to classify the plurality of control flow paths according to most frequently occurring one or more control flow paths for each request type.

14. The computer program product of claim 12, wherein the nature of access comprises a number of reads and/or writes.

15. The computer program product of claim 12, wherein program instructions to compute the dominant control flow path further comprise:
program instructions to label edges in the plurality of control flow paths, obtained from a mapping of the plurality of input request types to the plurality of control flow paths, with volume traffic and volume identification information;
program instructions to generate a cluster of paths and a cluster of volumes; and
program instructions to select the most common control flow path from the cluster of paths and the most common volume corresponding to the selected most common control flow path,
wherein the most common control flow path is a closest centroid of the cluster of paths.

16. The computer program product of claim 12, wherein the request for the volume management is generated responsive to a replication creation event.

17. A non-transitory computer-readable storage medium tangibly embodying a computer readable program code having computer readable instructions that, when executed, causes a processor to carry out a method comprising:
receiving a plurality of input request and corresponding plurality of input request types;
for each container, extracting a plurality of control flow paths and mapping the plurality of input request types to the plurality of control flow paths;
learning control flow path-to-volume mappings by computing, for each control flow path of the plurality of control flow paths, (i) one or more associations between the control flow path and one or more volumes and (ii) a nature of access of the one or more volumes;
for each pod replica, computing a dominant control flow path by computing a most common control flow path and a most common volume corresponding to the most common control flow path, wherein the dominant control path comprises:
labeling edges in the plurality of control flow paths, obtained from a mapping of the plurality of input request types to plurality of control flow paths, with volume traffic and volume identification information;
generating a cluster of paths and a cluster of volumes; and
selecting the most common control flow path from the cluster of paths and the most common volume corresponding to the selected most common control flow path; and
responsive to receiving a request for volume management of an identified most common volume, reducing a latency by locks on shared artifacts by determining whether a volume replication is warranted for each pod replica, and based on the determination either:
replicating the identified most common volume based on volume management information comprising information about the nature of access of the identified most common volume and/or information about a locking pressure of the identified most common volume, or
creating one or more views of the identified most common volume for pod sharing.

18. The non-transitory computer-readable storage medium of claim 17, wherein the mapping comprises classifying the plurality of control flow paths according to most frequently occurring one or more control flow paths for each request type.

19. The non-transitory computer-readable storage medium of claim 17, wherein the processor further computes the dominant control flow path by:
labeling edges in the plurality of control flow paths, obtained from a mapping of the plurality of input request types to the plurality of control flow paths, with a volume traffic and a volume identification information;

generating a cluster of paths and a cluster of volumes; and selecting the most common control flow path from the cluster of paths and the identified most common volume corresponding to the selected most common control flow path, wherein the most common control flow path is closest centroid of the cluster of paths.

20. The non-transitory computer-readable storage medium of claim 17, wherein the request for the volume management is generated responsive to a replication creation event.

\* \* \* \* \*